US010902394B2

United States Patent
Kuncl et al.

(10) Patent No.: US 10,902,394 B2
(45) Date of Patent: Jan. 26, 2021

(54) ONE LINE IN-CONTEXT USER INTERFACE

(71) Applicant: PAYPAL, INC., San Jose, CA (US)

(72) Inventors: Parker Kuncl, San Francisco, CA (US); Daniel Brain, San Jose, CA (US); Anurag Sinha, San Jose, CA (US); Miriam Ferhut, Sacramento, CA (US)

(73) Assignee: PayPal, Inc., San Jose, CA (US)

( * ) Notice: Subject to any disclaimer, the term of this patent is extended or adjusted under 35 U.S.C. 154(b) by 1118 days.

(21) Appl. No.: 15/239,500

(22) Filed: Aug. 17, 2016

(65) Prior Publication Data

US 2018/0053183 A1 Feb. 22, 2018

(51) Int. Cl.
*G06Q 30/00* (2012.01)
*G06Q 20/12* (2012.01)
*G06Q 30/06* (2012.01)
*G06Q 20/38* (2012.01)

(52) U.S. Cl.
CPC ......... *G06Q 20/12* (2013.01); *G06Q 20/3821* (2013.01); *G06Q 30/0601* (2013.01)

(58) Field of Classification Search
CPC . G06Q 20/12; G06Q 30/0601; G06Q 20/3821

USPC .......................................................... 705/75
See application file for complete search history.

(56) References Cited

U.S. PATENT DOCUMENTS

| 7,406,516 | B2* | 7/2008 | Davis | G06F 11/3495 |
| | | | | 709/224 |
| 9,251,372 | B1* | 2/2016 | Lahoz | G06Q 30/0613 |
| 10,318,941 | B2* | 6/2019 | Chawla | G06Q 20/12 |
| 2010/0306076 | A1* | 12/2010 | Taveau | G06Q 20/02 |
| | | | | 705/26.8 |

* cited by examiner

*Primary Examiner* — Luis A Brown
*Assistant Examiner* — Michael I Ezewoko
(74) *Attorney, Agent, or Firm* — Haynes and Boone LLP

(57) ABSTRACT

The systems and methods that generate a one-touch frame are provided. A line of code including a tag is inserted into a webpage. The tag includes a link to a server from which parameters for the frame are obtained. The browser uses the parameters to generate the frame. In addition, the server or a local memory of a computing device on which the frame is generated also store credentials associated with a user account. These credentials are also obtained and incorporated into the frame. The frame may then be activated to perform one-touch functions using the credentials.

21 Claims, 11 Drawing Sheets

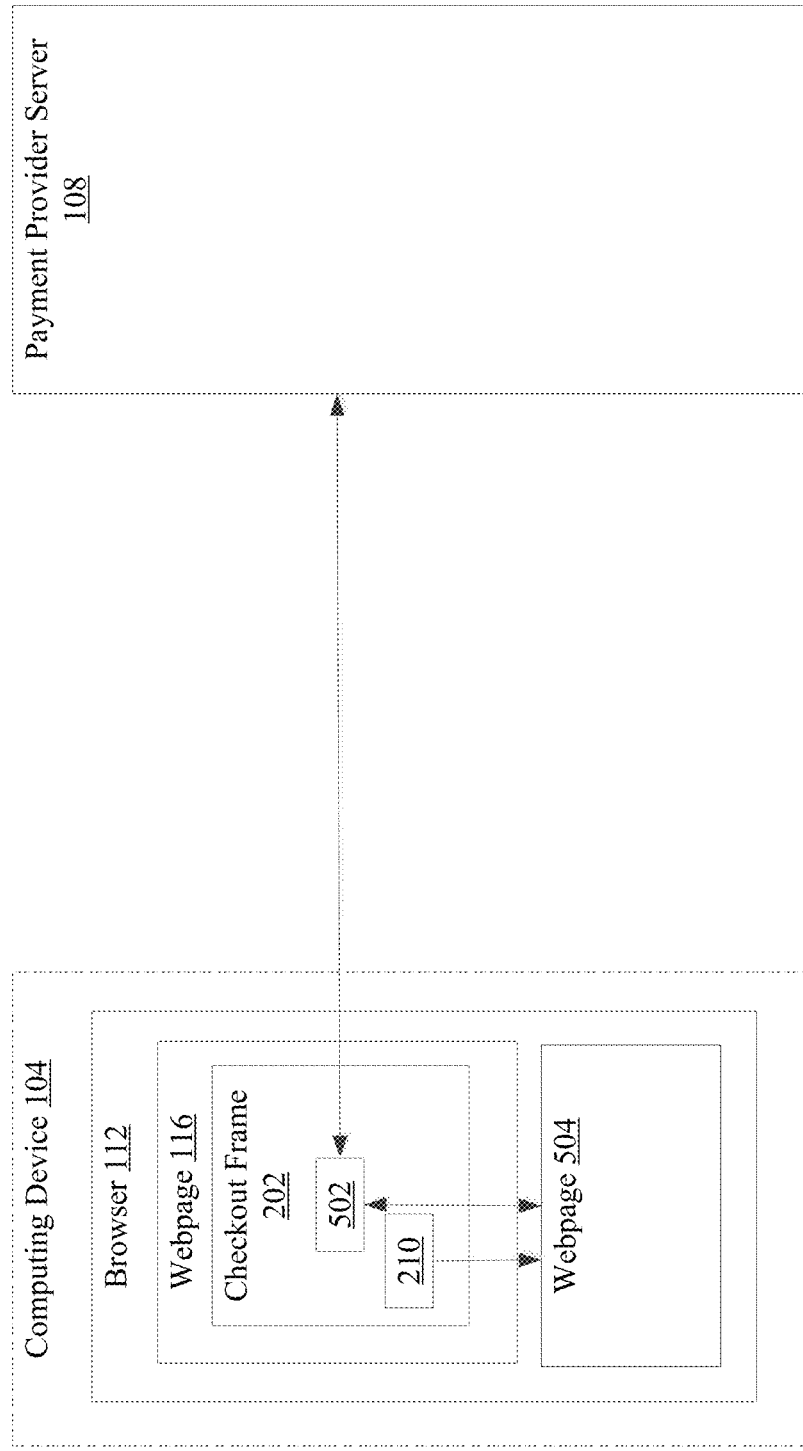

ONE LINE IN-CONTEXT USER INTERFACE

TECHNICAL FIELD

The disclosure generally relates to website optimization, and more specifically to using a tag implemented as a single line of source code to generate an interactive frame on any website.

BACKGROUND

A webpage receives input from users. The input allows users to manipulate a webpage and use a webpage to conduct transactions with a server. In this case, the fewer clicks the webpage receives from the user to conduct transactions, the more seamless is the user experience.

Additionally, when a webpage receives user input and conducts transactions, different data may be transmitted and received by the webpage. In this case, the webpage may "hang" or otherwise be unable to receive user input while the webpage waits to receive data or processes data. Additionally, the webpage may also become desynchronized with another webpage that also receives user input and conducts the same or similar transaction.

BRIEF DESCRIPTION OF THE DRAWINGS

FIG. 5 is a block diagram of a frame included in a first webpage launching a second webpage, according to an embodiment.

Figure 1:
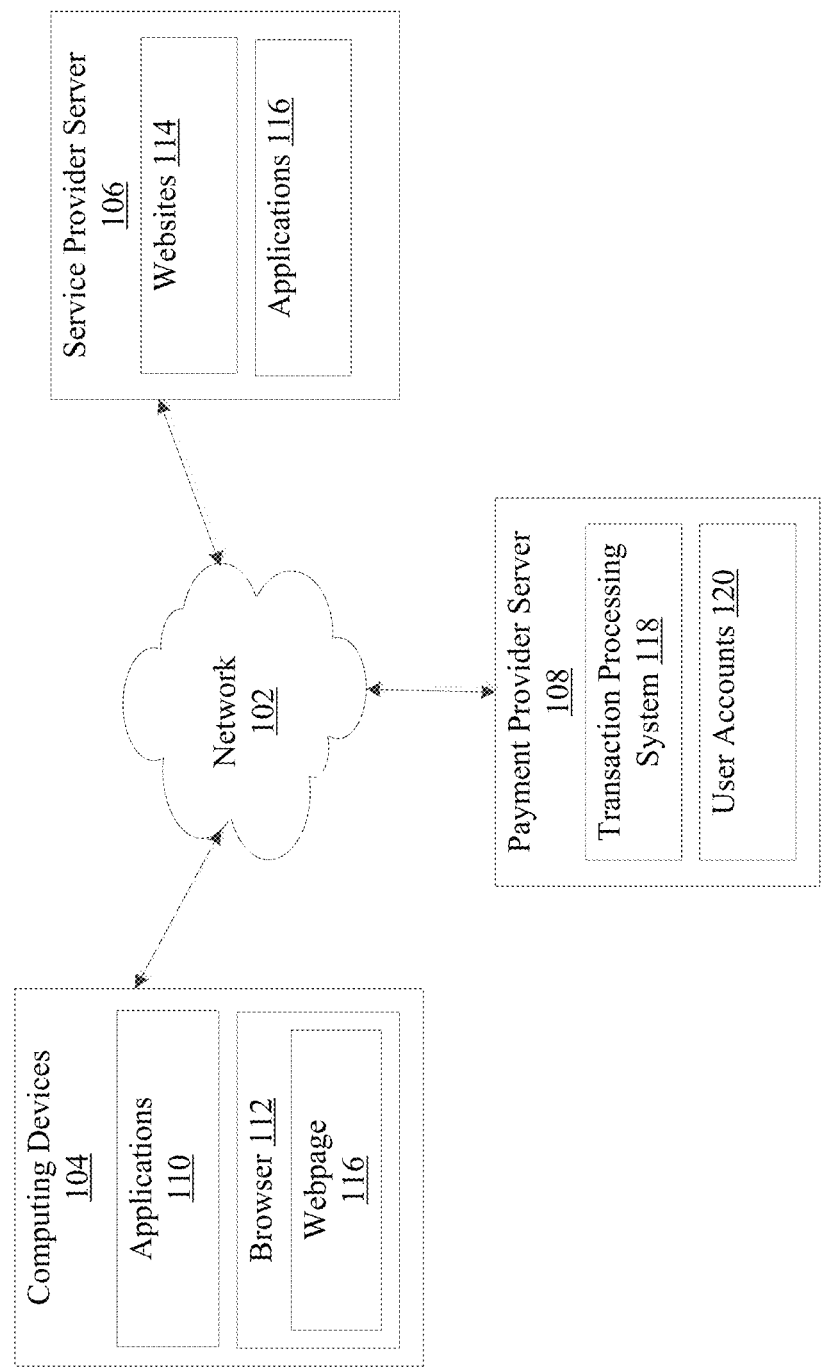
FIG. 1 is an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The systems and methods provide a frame. The frame may be incorporated into any webpage or application of any service provider that executes on a computing device with a single line of code. The single line of code includes a tag with a uniform resource locator (URL) incorporated into the tag. The URL includes an address of a server that stores parameters that generate the frame. Some of these parameters may be specific to a service provider. When a tag is activated, such as when a webpage is downloaded from a website or when a portion of an application that includes the tag is accessed, the computing device uses the URL included in the tag to download the parameters from the server and generate the frame.

Once the frame is generated, credentials that are associated with a user are incorporated into the frame. These credentials may be obtained from a server where the user has a user account and/or that conducts transactions on behalf of the user, from a cache memory of a computing device, and/or from a webpage or application that hosts the frame. After the frame obtains the credentials, the frame may receive input from a user, such as one-touch input, to conduct a transaction. Example transactions may be a payment transaction for goods or services purchased using the webpage or the application.

In an embodiment, the frame may also include different optimization techniques. These optimization techniques allow the frame to receive credentials and other data incrementally. In this way, the frame may allow the webpage to display the already received credentials, and also other data included in the webpage, allow the webpage to receive input, etc., rather than letting the webpage hang without displaying data or receiving input while the frame waits for and retrieves the credentials. Other optimization techniques allow the frame to synchronize with another webpage or application that also includes user credentials. In this way, when the other webpage is updated, the change in credentials may be reflected in the frame. These synchronization techniques may include long messages between a server and the frame or post messages between the other webpage and the frame.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network, accessible by the various components of system 100.

Various components that are accessible to network 102 may be computing devices 104, service provider server(s) 106, and payment provider server(s) 108. Computing devices 104 may be portable and non-portable electronic devices under control of a user and configured to transmit, receive, and manipulate data from service provider server(s) 106 and payment provider server(s) 108 over network 102.

Example computing devices 104 include desktop computers, laptop computers, tablets, smartphones, wearable computing devices, eyeglasses that incorporate computing devices, implantable computing devices, etc.

Computing devices 104 may include one or more applications 110. Applications 110 may be pre-installed on the computing devices 104, installed on the computing devices 104 using portable memory storage devices, such as compact disks or thumb-drives, or be downloaded to the computing devices 104 from service provider server(s) 106. Applications 110 may be executed on the computing devices 104 and receive instructions and data from a user, from service provider server(s) 106, and payment provider server(s) 108.

Example applications 110 installed on computing devices 104 may be payment transaction applications. Payment transaction applications may be configured to transfer money world-wide, receive payments for goods and services, manage money spending, etc. Further, applications 110 may be under an ownership or control of a payment service provider, such as PAYPAL®, Inc. of San Jose, Calif., USA, a telephonic service provider, a social networking service provider, and/or other service providers. Applications 110 may also be analytics applications. Analytics applications perform business logic, provide services, and measure and improve performance of services and functions of other applications that execute on computing devices 104 based on current and historical data. In another embodiment, applications 110 may be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102. In yet another embodiment, applications 110 may be location detection applications, such as a mapping, compass, and/or global positioning system (GPS) application. Further, applications 110 may be social networking applications and/or merchant applications. In yet another embodiment, applications 110 may be service applications that permit a user of computing device 104 to receive, request and/or view information for products and/or services, and also permit the user to purchase the selected products and/or services.

In an embodiment, applications 110 may utilize numerous components included in computing device 104 to display, receive input, store data, and communicate with network 102. Example components are discussed in detail in FIG. 8.

In yet another embodiment, computing device 104 may include a browser 112. Browser 112 may be a software application installed on computing device 104 that retrieves, processes, traverses, and presents information over the Internet or the World Wide Web. The information retrieved, processed, traversed, presented, etc., may be a resource identifiable by a uniform resource identifier (URI) or a uniform resource locator (URL) and be retrieved from website 114. In an embodiment, the resource may be a web page, an image, a video, or another piece of content. In a further embodiment, a resource may be a collection of one or more webpages 116 that may be accessed using the same URI/URL. These websites 114 may be accessible to a user using computing device 104 and may provide the same or similar products and/or services as applications 110.

As described above, one or more service provider servers 106 are also connected to network 102. Service provider server 106 may be an application executing on a computing device that provides services to a user using applications 110 that execute on computing devices 104 or that hosts websites 114 that provide webpages 116 to browser 112 for the same or similar services. Service provider server 106 may also be maintained by a service provider, such as PAYPAL®, a telephonic service provider, social networking service, and/or other service providers.

Service provider server 106 may also store and execute applications 117. Applications 117 may be counterparts to applications 110 executing on computing devices 104 or the backend that processes data received from webpages 116. Applications 117 may receive, process, and transmit data for user requested products and/or services transmitted from applications 110 or webpages 116. Thus, applications 117 may also be financial services applications configured to transfer money world-wide, receive payments for goods and services, manage money spending, etc. In an embodiment, applications 117 may also be security applications configured to implement client-side security features or programmatic client applications for interfacing with appropriate application programming interfaces (APIs) over network 102. In another embodiment, applications 117 may be communication applications that perform email, texting, voice, and instant messaging functions that allow a user to send and receive emails, calls, texts, and other notifications over network 102. In yet another embodiment, applications 117 may be location detection applications, such as a mapping, compass, and/or GPS applications. In yet another embodiment, applications 117 may also be incorporated into social networking applications and/or merchant applications.

In an embodiment, when application 110 or browser 112 transmits requests and/or data for different transactions to applications 117, applications 117 process these transactions. The transactions may be in a form of one or more messages that are transmitted over network 102. In a further embodiment, to process transactions using applications 117, service provider server 106 may request payment from a user using application 110 via payment provider server 108. For instance, the payment provider server 108 may receive transactions from applications 110, webpages 116, and applications 117 that cause the payment provider server 108 to transfer funds of a user using application 110 or webpage 116 to a service provider associated with service provider server 106.

In an embodiment, payment provider servers 108 may be maintained by a payment provider, such as PAYPAL®. Other payment provider servers 108 may be maintained by or include a merchant, financial services provider, credit card provider, bank, and/or other payment provider, which may provide user account services and/or payment services to a user. Although payment provider servers 108 are described as separate from service provider server 106, it is understood that one or more of payment provider servers 108 may include services offered by service provider server 108 and vice versa.

Each payment provider server 108 may include one or more processing applications, such as a transaction processing system 118. Transaction processing system 118 may correspond to processes, procedures, and/or applications executable by a hardware processor. In an embodiment, transaction processing system 118 may be configured to receive information from one or more applications 110, 116 executing on computing devices 104 and/or service provider server 106 for processing and completion of financial transactions. Financial transactions may include financial information corresponding to user debit/credit card information, checking account information, a user account (e.g., payment account with a payment provider server 108), or other payment information. Transaction processing system 118 may complete the financial transaction for the purchase request by providing payment to application 117 executing on service provider server 106. In various embodiments, transaction processing system 118 may provide transaction histories, including receipts, to computing device 104 in order to provide proof of purchase for an item and/or service.

Payment provider server 108 may also include user accounts 120. Each user account 120 may be established by one or more users using application 110 or websites 114 with payment provider server 108 to facilitate payment for goods and/or services offered by applications 117. User accounts 120 may include user information, such as name, shipping address, birthdate, payment/funding information, travel information, payment information, different methods of payment, and/or other desired user data. In a further embodiment, user accounts 120 may be stored in a database or memory storage described in detail in FIG. 8.

In an embodiment, to facilitate payment from applications 110 or webpages 116 for services rendered by the service provider server 106 and via payment provider server 108, service provider may incorporate a frame into webpages 116 of websites 114 or applications 110 provided to computing devices 104. In an embodiment, the frame may be integrated into websites 114 or applications 110 of any service provider using a single line of code. The single line of code includes a link which obtains parameters that generate the frame, as discussed below. In an embodiment, the frame may be a checkout frame that provides the user using application 110 or webpage 116 with user credentials stored in one of user accounts 120. Further, the checkout frame provides the user with one-touch functionality for conducting transactions, such as payment transactions for goods and services provided by applications 110 or websites 114. Although embodiments described below describe the frame as a checkout frame, the frame is not limited to these embodiments.

Figure 2:
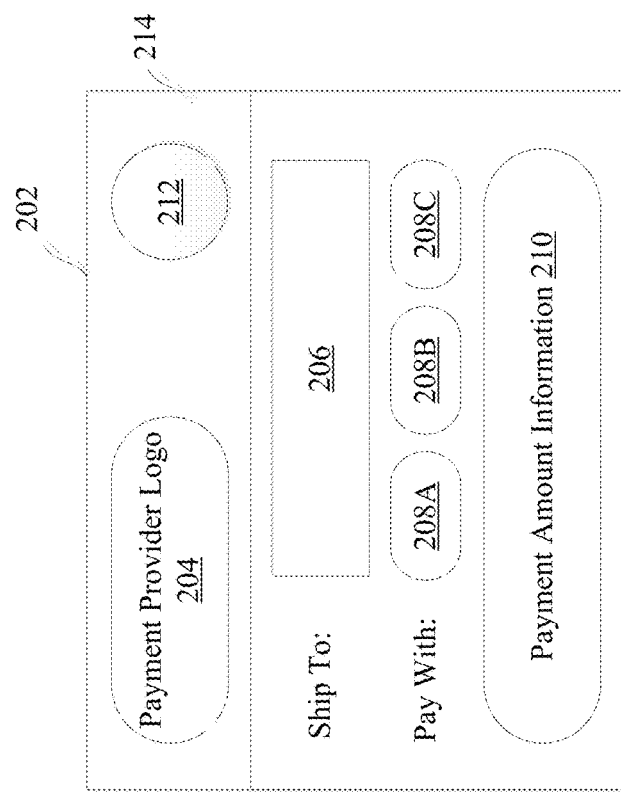
FIG. 2 is a block diagram of a frame, according to an embodiment.

FIG. 2 is a block diagram 200 of a frame, according to an embodiment. The frame, referred to as checkout frame 202 may be displayed when webpage 116 that includes the checkout frame 202 is downloaded from website 114 and rendered by browser 112 on the computing device 104, in one embodiment. In another embodiment, service provider may incorporate the checkout frame 202 into application 110.

In an embodiment, checkout frame 202 may provide one-touch functionality for transmitting messages that include data, credentials, etc., incorporated into checkout frame 202 when the checkout frame is generated. For example, checkout frame 202 may include one-touch functionality that conducts transactions, such as payment transactions for a goods or services purchased from website 114 or using application 110.

As will be described below, checkout frame 202 may be incorporated into a website 114 operated by one party (such as service provider server 106) in order to allow the user of the website 114 to conduct transactions via a second party (such as a payment provider server 108).

As will be discussed below, checkout frame 202 receives, displays, and transmits multiple credentials 204-214. These credentials 204-214 may be received and displayed using text boxes, buttons, banners, logos, etc. that are incorporated into checkout frame 202 at the time checkout frame 202 is generated and without input provided by the user. Example credentials 204-214 are described below.

In an embodiment, the checkout frame 202 may receive, store, and display credentials 204-214 from service provider server 106, payment provider server 108, and also from or based upon user input received from computing device 104. For example, checkout frame 202 may include a payment provider logo 204. The payment provider logo 204 is a credential that may be associated with an entity that owns and/or operates the payment provider server 108 (such as PAYPAL®) which may be the same or different entity that owns and operates the service provider server 106. As discussed above, payment provider server 108 processes transactions for payment of goods or services purchased using websites 114 or applications 110.

In an embodiment, checkout frame 202 may also include credentials which are stored in user accounts 120 of the payment provider server 108. The credentials may be specific to the user and may be changed based on the user received input. For example, checkout frame 202 may include shipping information of a user associated with user account 120. The shipping information 206 may include a shipping address and may be displayed in the "Ship To" address box shown in checkout frame 202, in one embodiment. Notably, the shipping information 206 is not associated, stored or provided by website 114 or application 110 of the service provider, but is rather stored on the payment provider server 108.

In yet another embodiment, checkout frame 202 may include credentials that represent payment instruments 208. The payment instruments 208 may reflect different funding sources used to conduct transactions. Example funding sources may include credit cards, debit cards, etc., associated with one of user account 120. The checkout frame 202 may display different payment instruments as payment instruments 208A-C. In a further embodiment, application 110 or browser 112 may receive an indication from a user that selects one of the payment instruments or changes between payment instruments, by selecting one of the displayed payment instruments 208A-C. In yet another embodiment, one of payment instruments 208A-C displayed by the checkout frame 202 may be preselected as a default payment instrument.

In an embodiment, checkout frame 202 may also be preconfigured with the payment amount information. The payment amount information may include the payment amount that the service provider charges a user via application 110 or website 114 for a good or a service. In an embodiment, the checkout frame 202 may display the payment amount information 210 in the payment information box. Notably, the payment information may be provided to checkout frame 202 from application 110 or webpage 116.

In an embodiment, checkout frame 202 may also include user identification content 212. Example user identification content 212 may be media content, such as an image, a video clip, etc. that are associated with a user of one of user accounts 120. The checkout frame 202 may display the user identification content 212 in a user identification box as shown in FIG. 2.

In an embodiment, portions of the checkout frame 202, such as portion 214 may also be color coded, shaded, textured, etc. to be associated with a service provider of website 114. For example, service provider may specify parameters that may be provided to checkout frame 202 (as will be discussed below) that cause portion 214 to include the service provider selected color, shade, etc.

A person of ordinary skill in the art will appreciate that the checkout frame 202 is exemplary and may have additional content incorporated into the frame. Example content may be an area or a box for a coupon code, a user or a member number associated with transaction processing system 118 or application 116, etc.

Figure 3:
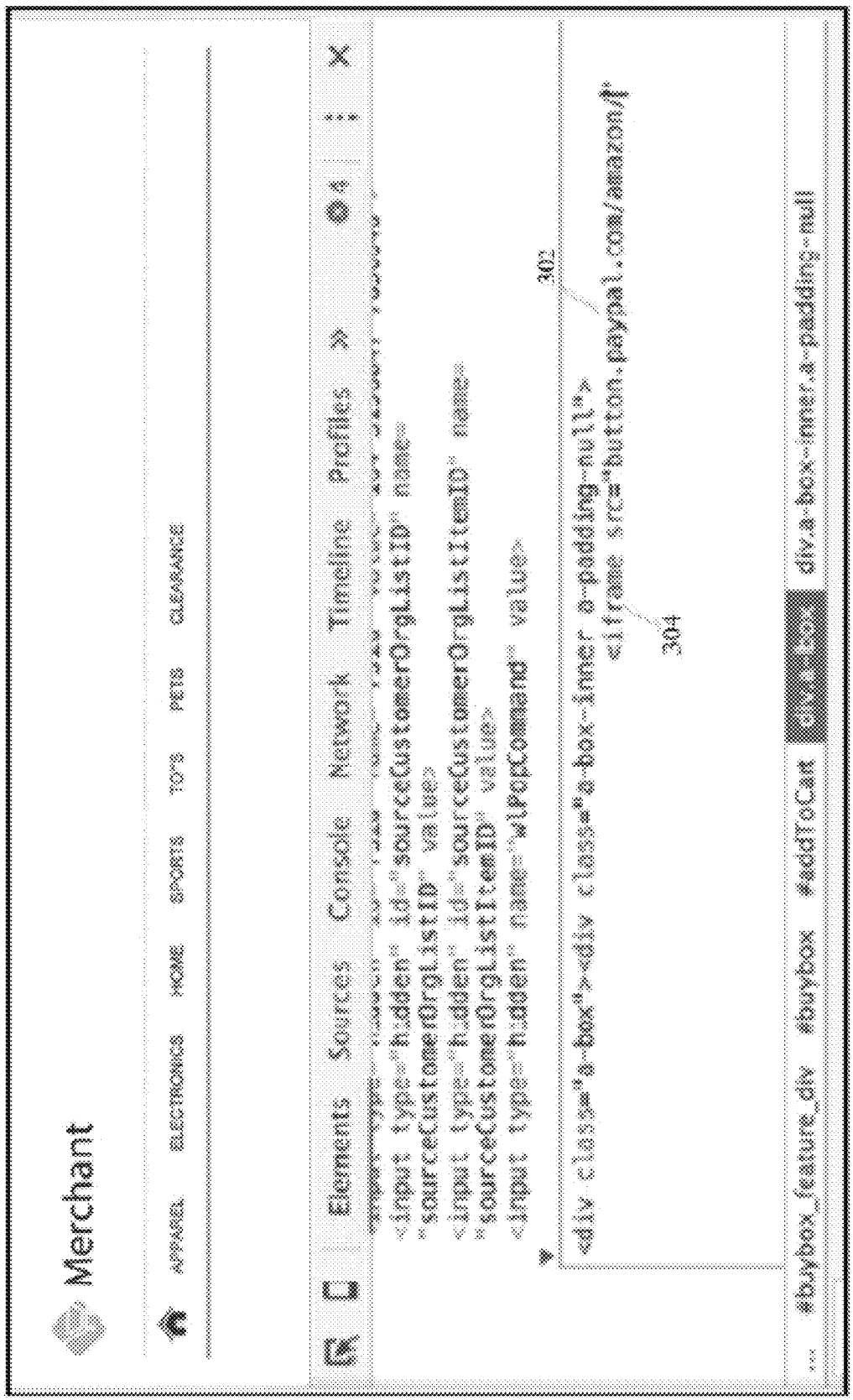
FIG. 3 is a screen shot of a website source code which incorporates a frame, according to an embodiment.

As discussed above, checkout frame 202 may be incorporated into multiple websites 114 that are generated by different service providers. In an embodiment, checkout frame 202 may be incorporated into different websites 114 using a single line of source code when the service provider creates website 114. Example source code may be in the HyperText Markup Language. FIG. 3 is a screen shot 300 of a website source code which incorporates a frame, according to an embodiment. The single line of code is shown as code 302. Included in code 302 may be a tag 304, such as an "iframe" tag. When activated by browser 112 or application 110, tag 304 creates a checkout frame 202. The single line of code may also be broken up into multiple lines of code as specified by HyperText Markup Language (HTML) or another language used to process and display websites 114.

In an embodiment, the single line of code 302 may also include a URL or a URI link. The URL/URI link may access payment provider server 108 or another server that stores parameters and/or code that initialize or generate checkout frame 202. In an embodiment, these parameters may be used to customize the checkout frame 202 and may include color, size, position, identifier, data, or other information specific to website 114, etc., of checkout frame 202 on webpage 116 or within application 110. In an embodiment, some of these parameters may also be included in the URL/URI link and may be passed to the payment provider server 108 from the "iframe" tag.

After a service provider includes the single line of code 302 into the website 114, the checkout frame 202 may then be stored on service provider server 106 together with website 114, until website 114 is requested by the browser 112 or is downloaded to computing device 104 as part of application 110.

Figure 4A:
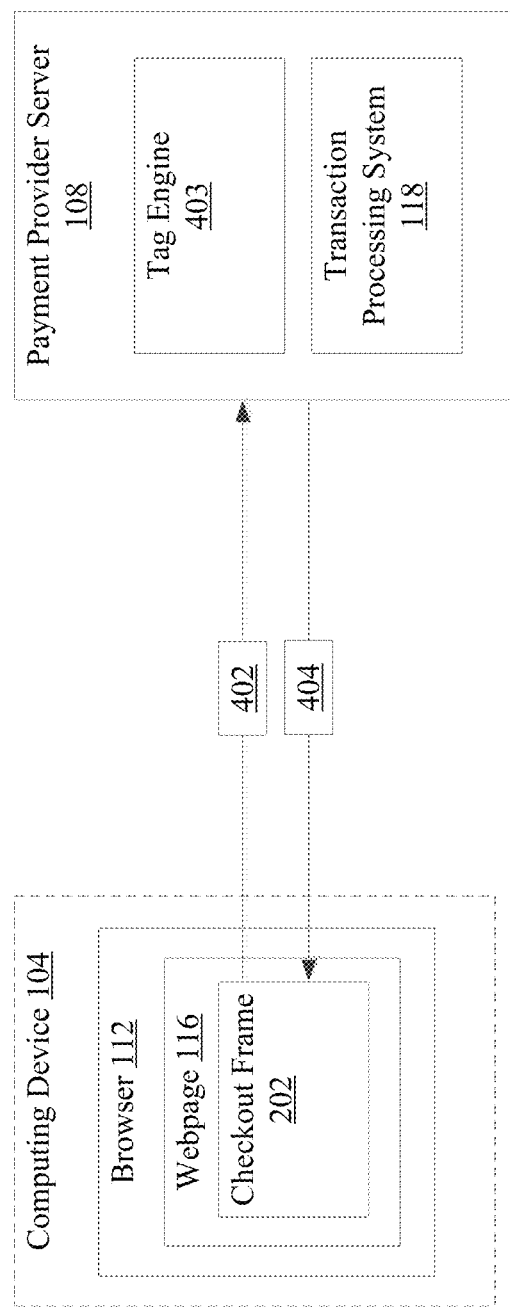
FIG. 4A is a block diagram of a frame being generated by retrieving information from a server, according to an embodiment.

In an embodiment, when browser 112 receives and processes webpage 116 that incorporates tag 304, browser 112 may generate an instance of checkout frame 202 and incorporate checkout frame 202 for display on a display screen of computing device 104. Similarly, when application 110 encounters tag 304, application 110 may also generate checkout frame 202. FIG. 4A is a block diagram 400A of a frame being generated by retrieving information from a server, according to an embodiment. In the embodiment described in FIG. 4A, the checkout frame 202 is being included on webpage 116, though the implementation is not limited to this embodiment. For example, application 110 that includes checkout frame 202 may also be used to perform the embodiments below.

To generate checkout frame 202, when browser 112 generates webpage 116 and encounters tag 304, browser 112 issues one or more request messages 402 to a server, such as the payment provider server 108, at the URL/URI included in the single line of code 302. The request message 402 may include one or more parameters, if any, included in the single line of source code 302 by the service provider. In an embodiment, the request message 402 may also include credentials of a user using computing device 104 (which may be received by computing device 104 from the user or have previously been entered by the user) that may verify the user to the server. In another embodiment, the request message 402 may include a tag and/or cookies which include a request for credentials 204-214 from the server, such as payment provider server 108.

In an embodiment, a server, such as payment provider server 108 may include a tag engine 403. The tag engine 403 includes parameters and source code that may be retrieved from the payment provider server 108 to generate checkout frame 202 on webpage 116 or application 110. Additionally, tag engine 403 may store different parameters specific to each service provider that incorporated tag 304 into webpage 116 or application 110. In an embodiment, the URL/URL in the request message 402 may specify the location of the parameters within tag engine 403.

When payment provider server 108 receives the request message 402, tag engine 403 may identify the service provider that is associated with tag 304 that generated the request message and retrieve the parameters for checkout frame 402 that are associated with the service provider. The tag engine 403 may then generate one or more response messages 404 that include the parameters associated with the service provider, and transmit the parameters to browser 112. One of these parameters may include data for the color of portion 214. In an embodiment, tag engine 403 may also transmit source code, such as HTML code that generates the checkout frame 202.

In an embodiment, request message 402 may also request credentials, such as credentials 204-208 and 212 that are specific to the user. In this case, transaction processing system 118 of payment provider server 108 may authenticate the user with one of user accounts 120 and, if the user is authenticated, incorporate data for credentials 204-208 and 212 into response message 404.

When browser 112 receives response message 404, browser 112 uses the parameters in the response message 404 to generate checkout frame 202. In an embodiment, when response message 404 includes data for credentials 204-208 and 212, browser 112 incorporates the data into credentials 204-208 and 212 when generating checkout frame 202.

Figure 4B:
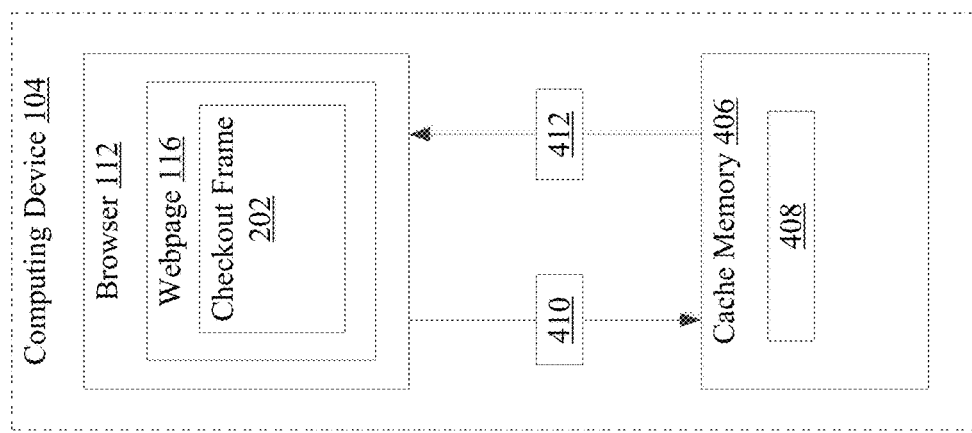
FIG. 4B is a block diagram of a frame using memory of a computing device to access credentials, according to an embodiment.
Figure 8:
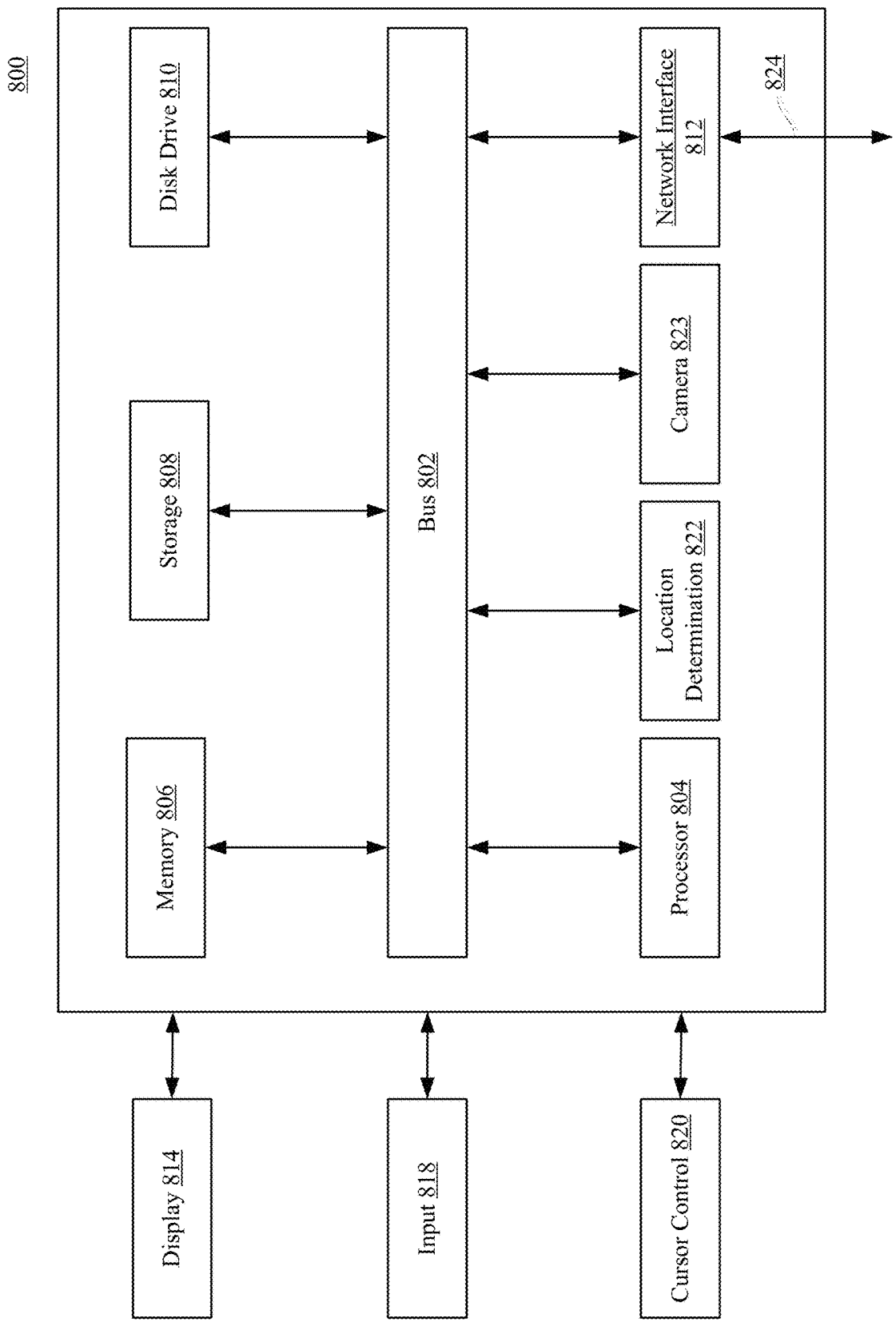
FIG. 8 is a block diagram of a computer system suitable for implementing one or more components in FIGS. 1-7, according to an embodiment.

In an embodiment, browser 112 may also store the data associated with tag 304, such as data for credentials 204-214 and parameters that may be used to generate checkout frame 202 in a memory of computing device 104, such as cache memory 406 and/or one of memories described in FIG. 8. FIG. 4B is a block diagram 400B of a frame using memory of a computing device to access credentials, according to an embodiment. For example, once browser 112 receives some or all credentials 204-214 from payment provider server 108 as described above, browser 112 or checkout frame 202 may store credentials 204-214 in cache memory 406. For example, credentials 204-214 may be stored as checkout data 408. Along with credentials 204-214, checkout data 408 may also store an identifier of webpage 116 or service provider that requested credentials 204-214, as checkout frame 202 may be included on numerous unrelated webpages associated with numerous unrelated websites 114. In this way, browser 112 may use checkout data 408 from cache memory 406 to generate checkout frame 202 or repopulate the checkout frame 202 with credentials 204-214 in the future.

As browser 112 generates checkout frame 202, rather than transmitting one or more request message 402 to the payment provider server 108, browser 112 may query cache memory 406 for checkout data 408 using request message 410. When checkout data 408 associated with webpage 116 exists, computing device 104 may generate a response message 412 that includes some or all parameters and/or credentials 204-214 from cache memory 408. Browser 112 may then generate checkout frame 202 using the checkout data 408 and/or populate checkout frame 202 using credentials 204-214 from cache memory 406. In this way, when checkout frame parameters or credentials 204-214 for checkout frame 202 exist in cache memory 406, checkout frame 202 may be generated or populated with credentials 204-214 without generating and transmitting one or more request messages 402 to payment provider server 108.

Figure 4C:
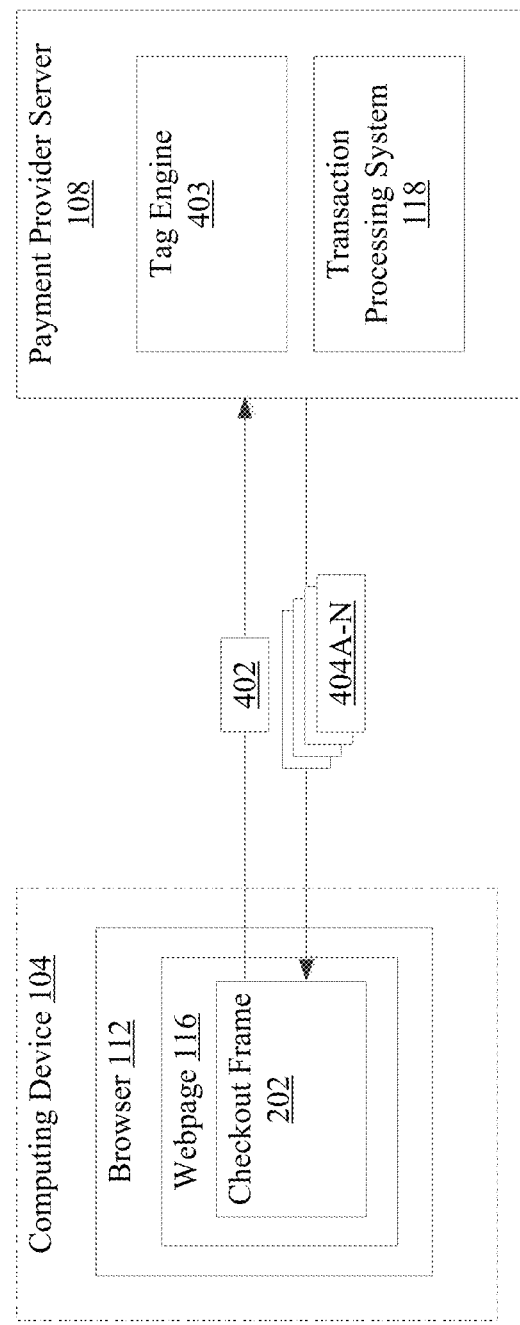
FIG. 4C is a block diagram of a payment provider server generating multiple response messages that provide data to the frame, according to an embodiment.

In an embodiment, payment provider server 108 may also generate multiple response messages. FIG. 4C is a block diagram 400C of a server generating multiple response messages that provide data to the frame, according to an embodiment. As illustrated in block diagram 400C, payment provider server 108 generates multiple response messages 404A-N in response to one or more request message 402. Each of the multiple response messages 404A-N may include pieces of the HTML, Java Script ("JS"), and static content used to generate content frame 202. Additionally, response messages 404A-N may also include some or all credentials 204-214.

In an embodiment, payment provider server 108 transmits response messages 404A-N to computing device 104 incrementally. This may occur, for example, when tag engine 303 provides parameters from which checkout frame 202 may be generate, but transaction processing system 118 has not yet provided data for credentials 204-208 and 212. In this case, payment provider server 108 generates one of response messages 404A-N and transmits the one of the response messages 404A-N to computing device 104. When payment provider server 108 retrieves more data, payment provider server 108 generates another one of response messages 404A-N. In an embodiment, response messages 404A-N may be in a JavaScript Object Notation ("JSON") format. Because response messages 404A-N are transmitted incrementally, the browser 112 of computing device 104 may receive response messages 404A-N incrementally as well. Once received, browser 112 may display data pertaining to checkout frame 202 on webpage 116 from the response messages 404A-N, without waiting the other response messages 404 to arrive from the payment provider server 108. In this way, browser 112 may display parts of webpage 116, including parts of checkout frame 202 as browser 112 continues to receive data, instead of waiting for data for entire webpage 116 to arrive before generating checkout frame 202.

Figure 4D:
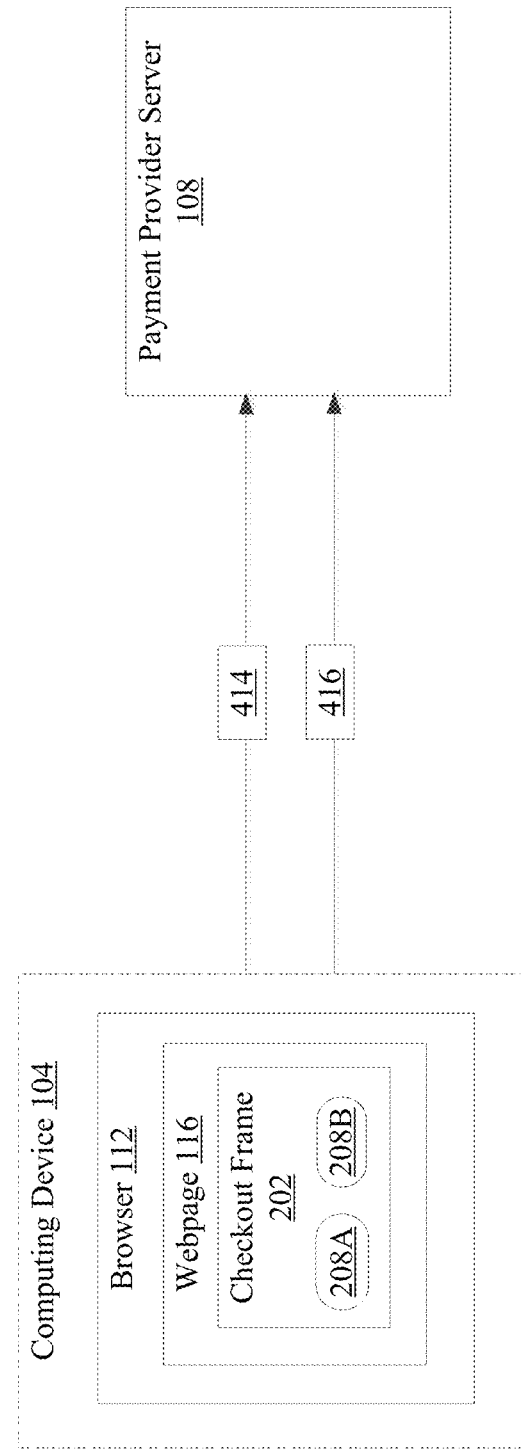
FIG. 4D is a block diagram of a system where a frame interacts asynchronously with a server, according to an embodiment.

In an embodiment, checkout frame 202 may also cause browser 112 to generate asynchronous calls to the payment provider server 108 or another server. FIG. 4D is a block diagram 400D of a system where a frame interacts asynchronously with a server, according to an embodiment. For example, checkout frame 202 may issue an asynchronous call to a server, such as payment provider server 108 when checkout frame 202 receives input from a user. The user input may be a change of the funding source, such as a change from payment instrument 208A to payment instrument 208B. Upon receiving a change in the payment instrument, checkout frame 202 immediately, or as soon as technologically possible, reflects the change of the payment instrument. For example, checkout frame 202 indicates that payment instrument 208B will now be a funding source for the transaction. Additionally, upon receiving the change in the payment instrument, checkout frame 202 also causes browser 112 to issue an asynchronous message 414 to the payment provider server 108. Asynchronous message 414 may be a message that is issued upon a change of state in checkout frame 202, and not upon browser 112 receiving a "submit" or "enter" indication from a user. The asynchronous message 414 may include the change of the payment instruction, which causes the payment provider server 108 to change the funding source from payment instrument 208A to payment instrument 208B. In an embodiment, after browser 112 issues the asynchronous message 414, browser 112 does not wait until the payment provider server 108 confirms the asynchronous message 414 and/or updates the funding source on the payment provider server 108. Rather, browser 112 continues to receive input from a user, if any, and continues to allow the user to interact with computing device 104. Additionally, once checkout frame 202 receives a one-touch indication (or another indication) from a user to submit payment for goods or services bought using website 114, checkout frame 202 may issue payment message 416. However, checkout frame 202 may exclude the change in payment instrument from the payment message 416, as the change in the payment instrument was already communicated to the payment provider server 108 using asynchronous message 414.

As discussed above, checkout frame 202 provides a one-touch experience for conducting a transaction on website 114. In an embodiment, the one-touch experience depends on a user maintaining a user account in user accounts 120 on the payment provider server 108 and check frame 202 obtaining credentials 204-208 and 212 from the payment provider server 108 after authenticating the user. When, checkout frame 202 is unable to authenticate the user, a user-received input on the payment amount information 210, or another portion of the checkout frame 202 may cause the checkout frame 202 to launch a second webpage or a second instance of browser 112, as illustrated in an embodiment of block diagram 500 of FIG. 5. The second webpage, referred to as webpage 504, may be a webpage associated with the payment provider server 108 that may receive user credentials and access or establish a user account in the user account 120, and also change the state of the user account on payment provider server 108. Once webpage 504 receives user credentials and provides the user credentials to the payment provider server 108, payment provider server 108 may provide access to the user account in user accounts 120 associated with the user, including shipping address, preferred payment instrument information, and other data included and displayed by the checkout frame 202.

In an embodiment, checkout frame 202 may include a synchronization engine 502. The synchronization engine 502 may synchronize some or all credentials 204-208 and 212 of checkout frame 202 with credentials available to webpage 504. For instance, synchronization engine 502 may ensure that one of the payment instruments 208A-C selected via webpage 504 is reflected in checkout frame 202 of webpage 116. In another embodiment, if webpage 504 is used to include new user identification content, synchronization engine 502 may ensure that the new user identification content is reflected in the identification box of the checkout frame 202. In another embodiment, if webpage 504 is used to add or modify a shipping address, synchronization engine 502 may ensure that address box within the checkout frame 202 reflects the change in the shipping address. In yet another embodiment, if webpage 504 receives approval for the transaction displayed in checkout frame 202, then synchronization engine 502 may cause the checkout frame 202 to display that the payment has been made to the payment provider server 108.

In one embodiment, synchronization engine 502 may use long polling to synchronize checkout frame 202 with webpage 504 and user account information on payment provider server 108 received from webpage 504. In long polling, synchronization engine 502 polls a server, such as payment provider server 108 for data. Example data may be data associated with credentials 204-208 and 212 received via webpage 504. When synchronization engine 502 receives the data in response to the poll, checkout frame 202 updates some or all credentials 204-208 and 212 with the data in the response. Once synchronization engine 502 receives the data, synchronization engine 502 may issue another long poll to payment provider server 108 in order to synchronize checkout frame 202 with the data transmitted from webpage 504 to payment provider server 108 subsequent to the update. In an embodiment, long polling may be implemented using HTTP, Python, Ruby, JavaScript, etc.

In another embodiment, synchronization engine 502 may also synchronize checkout frame 202 with the information entered or stored on webpage 504. In this embodiment, synchronization engine 502 may receive post messages from webpage 504. The post messages are messages that may communicate between different webpages of browser 112 or between different instances of browser 112. The post messages may include data entered on webpage 504 that changes some or all credentials 204-208 and 212 displayed by the checkout frame 202. Additionally, post messages may also include data that indicates that webpage 504 transmitted payment instructions for a good or service displayed on webpage 116 to payment provider server 108.

Figure 6:
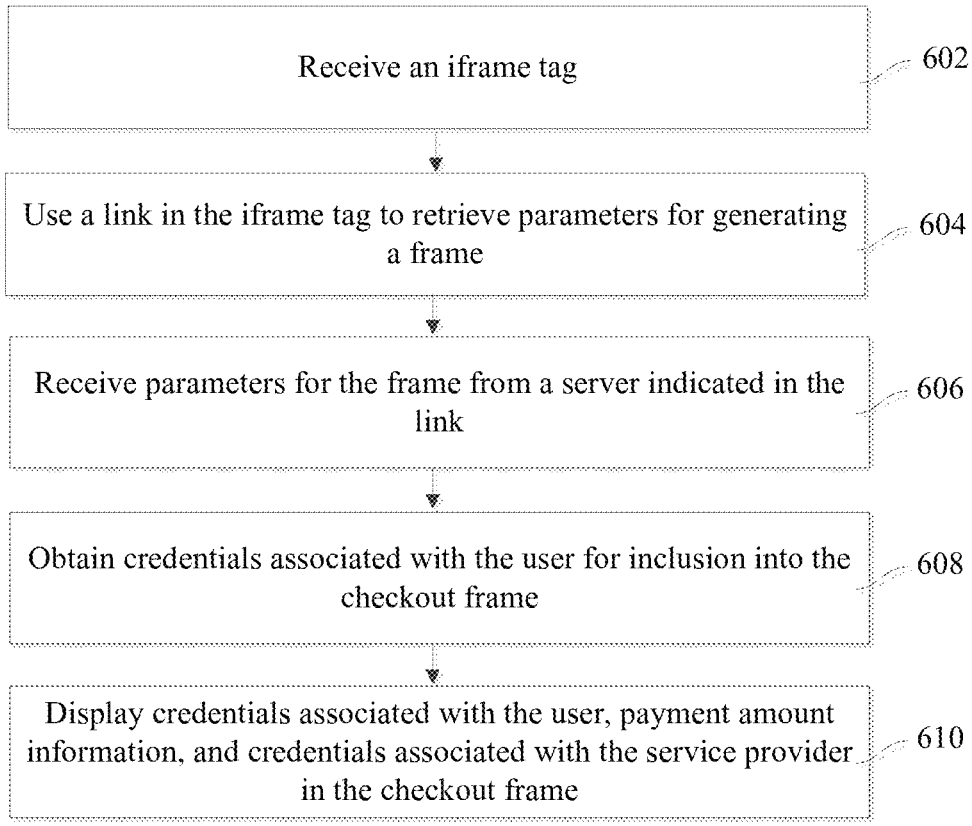
FIG. 6 is a flowchart of a method for generating a frame, according to an embodiment.

FIG. 6 is a flowchart of a method 600 for generating a frame, according to an embodiment. Method 600 may be performed using hardware and/or software components described in FIGS. 1-5. Note that one or more of the operations may be deleted, combined, or performed in a different order as appropriate. Additionally, operations 602-608 described below may be implemented on any webpage 116 that includes tag 304 that generates checkout frame 202.

At operation 602, an iframe tag is received. For example, computing device 104 receives a message that generates webpage 116. The message includes tag 304, such as an iframe tag inserted by the service provider associated with website 114. As described above, tag 304 may include a URL/URI link which provides parameters to browser 112 to generate checkout frame 202.

At operation 604, a link in the iframe tag is used to retrieve parameters. For example, as browser 112 renders webpage 116, browser 112 activates the link in the iframe tag. The activated link provides browser 112 with parameters stored on a server, such as payment provider server 108 that cause browser 112 to generate checkout frame 202. For instance, browser 112 may transmit the request message 402 to a server indicated in the URL/URI link that requests parameters for generating checkout frame 202.

At operation 606, parameters are received. For example, browser 112 receives response message 404 that includes parameters for payment provider server 108 that generate checkout frame 202. In an embodiment, service provider specific information, such as, service provider specific setting of color, texture, shade, etc., to the checkout frame 202 may also be received.

At operation 608, credentials associated with the user are obtained. For example, checkout frame 202 may request data for credentials 204-208 and 212 from checkout data 408 stored in cache memory 406 using request message 410. The checkout data 408 may include credentials 204-208 and 212 that are displayed within checkout frame 208. In response, browser 112 may receive the response message 412 that includes data for credentials 204-208 and 212. In another example, browser 112 may request data for credentials 204-208 and 212 from payment provider server 108. As described above, this request may be included in one or more request messages 402. In response, browser 112 may receive the response message 404 from the payment provider server 108 that includes data for credentials 204-208 and 212. Also, as described above, response messages 404, such as response messages 404A-N may also be received incrementally from payment provider server 108, such that each response message 404 is incrementally incorporated into checkout frame 202.

At operation 610, data in the credentials is displayed in the checkout frame. For example, data for credentials 204-208 and 212 may be displayed within checkout frame 202. Further, data associated with the service provider, such as color, shade, texture, etc., of portion 214 is also displayed in the checkout frame 202. Finally, data pertaining to the purchase of a good or a service is displayed in the checkout frame as payment amount information 210. Notably, checkout frame 202 obtains and displays credentials 204-214 on webpage 116 without incurring input from a user.

Figure 7:
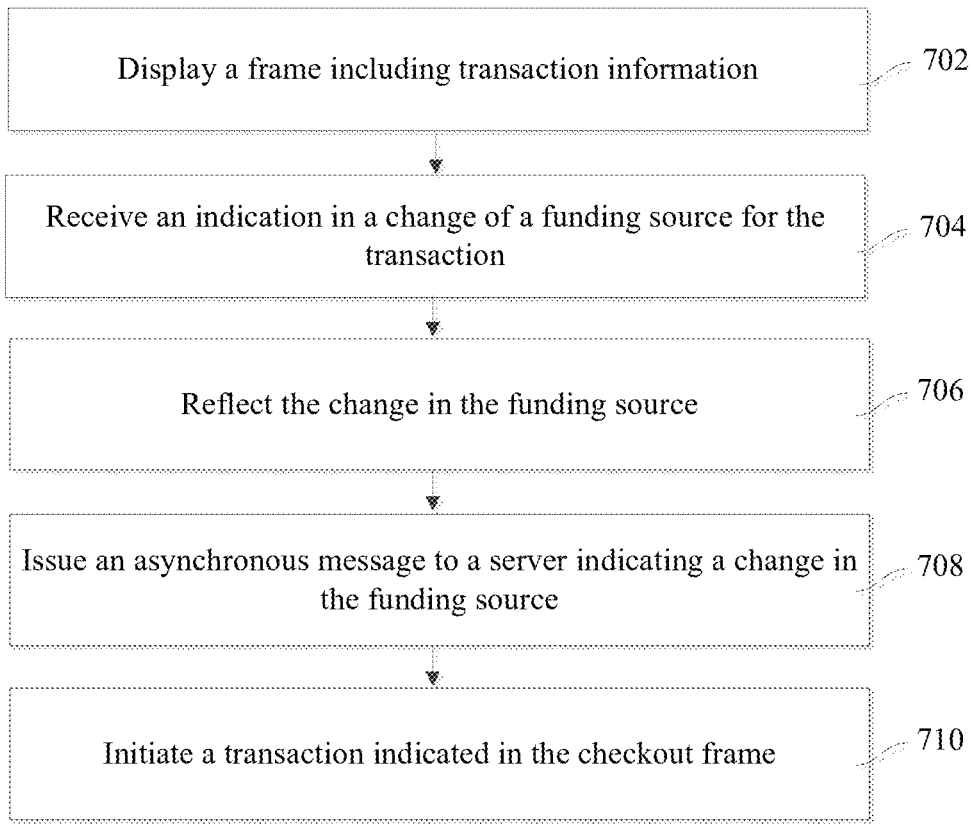
FIG. 7 is a flowchart of a method for using a frame to conduct a transaction, according to an embodiment.

FIG. 7 is a flowchart of a method 700 for using a frame to conduct a transaction, according to an embodiment. Method 700 may be performed using hardware and/or software components described in FIGS. 1-5. Note that one or more of the operations may be deleted, combined, or performed in a different order as appropriate.

At operation 702, a checkout frame with transaction information is displayed. For example, checkout frame 202 displays the transaction information in credentials 204-214.

At operation 704, the checkout frame receives an indication of a change in a funding source for the transaction. For example, computing device 104 may receive input that changes the preferred payment instrument from 208A to 208B.

At operation 706, the checkout frame reflects the change of operation 704. For example, checkout frame 202 reflects the change in the preferred payment instrument from 208A to 208B as soon as technologically possible.

At operation 708, the checkout frame issues an asynchronous message to the payment provider server. For example, checkout frame 202 issues the asynchronous message 414 to the payment provider server 108. The asynchronous message 414 indicates to the payment provider server 108 that the user associated with one of user accounts 120 changed the preferred funding source. Notably, checkout frame 202 performs operation 706 without waiting for payment provider server 108 to process asynchronous message 414 of operation 708.

At operation 710, a transaction indicated in the checkout frame is initiated. For example, once checkout frame 202 receives a one-touch indication to perform a transaction to purchase a good or a service from website 114, checkout frame 202 sends a message to the payment provider server 108 to conduct the transaction. In an embodiment, the indication may be a one-touch click on the payment amount information 210 or another portion of checkout frame 202. In a further embodiment, checkout frame 202 may exclude information transmitted in asynchronous message 414 from the message of operation 710.

Referring now to FIG. 8 an embodiment of a computer system 800 suitable for implementing, the systems and methods described in FIGS. 1-7 is illustrated.

In accordance with various embodiments of the disclosure, computer system 800, such as a computer and/or a server, includes a bus 802 or other communication mechanism for communicating information, which interconnects subsystems and components, such as a processing component 804 (e.g., processor, micro-controller, digital signal processor (DSP), graphics processing unit (GPU), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), a location determination component 822 (e.g., a Global Positioning System (GPS) device as illustrated, a cell tower triangulation device, and/or a variety of other location determination devices known in the art), and/or a camera component 823. In one implementation, the disk drive component 810 may comprise a database having one or more disk drive components.

In accordance with embodiments of the disclosure, the computer system 800 performs specific operations by the processor 804 executing one or more sequences of instructions contained in the memory component 806, such as described herein with respect to the mobile communications devices, mobile devices, and/or servers. Such instructions may be read into the system memory component 806 from another computer readable medium, such as the static storage component 808 or the disk drive component 810. In other embodiments, hard-wired circuitry may be used in place of or in combination with software instructions to implement the disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 800. In various other embodiments of the disclosure, a plurality of the computer systems 800 coupled by a communication link 824 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
   a non-transitory memory storing instructions; and
   one or more hardware processors coupled to the non-transitory memory and configured to read the instructions from the non-transitory memory to cause the system to perform operations comprising:
   receiving, at a client device, a message from a first server, wherein the message is usable to generate a webpage and includes a tag and a link within the tag;
   retrieving, at the client device and using a location specified in the link, at least one parameter from a second server, wherein the at least one parameter is usable to generate a one-touch frame at the client device;
   generating the one-touch frame, at the client device, using the at least one parameter retrieved from the second server;
   retrieving, at the client device, at least one credential associated with a user of the client device;
   displaying the at least one credential in the one-touch frame; and
   receiving input within the one-touch frame, wherein the input causes the one-touch frame to transmit a transaction to the second server.

2. The system of claim 1, wherein the one-touch frame is incorporated into the webpage displayed on a browser of a computing device that receives the tag.

3. The system of claim 1, wherein the at least one credential is retrieved from the second server.

4. The system of claim 1, wherein the at least one credential is retrieved from a computing device that received the tag.

5. The system of claim 1, wherein the tag is a single line of code that includes an iframe.

6. The system of claim 1, wherein the at least one credential is retrieved from the second server in a user-account associated with the user.

7. The system of claim 1, wherein the one-touch frame is a checkout frame that is operable to conduct the transaction with the second server and wherein the at least one credential includes a credential associated with the user and a credential associated a payment amount.

8. The system of claim 1, wherein the at least one credential includes at least one of a payment instrument, a shipping address, or a payment amount.

9. The system of claim 1, wherein the input causes the one-touch frame to determine whether the input indicates a change of state in the one-touch frame, wherein the one-touch frame issues an asynchronous call to the second server independent of the transaction and transmits an asynchronous message with an indication of the change of state in the one-touch frame to the second server through the asynchronous call when the input indicates the change of state in the one-touch frame, wherein the one-touch frame displays the change of state independent of a response from the second server.

10. A method, comprising:
receiving, at a client device, a message from a web site of a service provider server, wherein the message is usable to generate a webpage and includes a tag, wherein the tag includes a link to a second server that processes a transaction for a service provided by the service provider server;
activating, at the client device, the link to retrieve at least one parameter from a location of the second server specified in the link, wherein the at least one parameter is usable to generate a frame;
receiving, at the client device, the least one parameter from the location specified in the link;
generating, at the client device, the frame using the at least one parameter;
retrieving a plurality of credentials, wherein the plurality of credentials are incorporated into the frame;
displaying the plurality of credentials in the frame;
receiving an input within the frame; and
based on the input, transmitting, using the frame, the transaction and at least one credential from the plurality of credentials to the second server.

11. The method of claim 10, wherein the plurality of credentials are retrieved from a cache memory of a computing device that generated the frame.

12. The method of claim 10, further comprising:
receiving a second webpage having access to the plurality of credentials; and
synchronizing the frame with the plurality of credentials accessible from the second webpage.

13. The method of claim 10, wherein the tag is a single line of code that includes an iframe.

14. The method of claim 10, wherein the frame is a checkout frame which conducts the transaction and the second server is a payment provider server.

15. The method of claim 10, wherein receiving at the least one parameter further comprises:
receiving a first parameter in a first asynchronous message and a second parameter in a second asynchronous message at different times; and wherein the method further comprises:
displaying the first parameter within the frame prior to receiving the second parameter and completing generating the frame.

16. The method of claim 10, wherein the at least one credential is at least one of a payment instrument, a shipping address, an identification content or a payment amount.

17. A system, comprising:
a non-transitory memory storing instructions; and
one or more hardware processors coupled to the non-transitory memory and configured to read the instructions from the non-transitory memory to cause the system to perform operations comprising:
activating, at a client device, a link embedded within a tag included in a webpage received from a first server, wherein the link includes a uniform resource locator (URL) to a second server which stores a parameter for generating a one-touch frame;
retrieving, using the client device, the parameter from the second server using the activated link;
generating, at the client device, the one-touch frame using the parameter;
displaying credentials associated with a user and a payment amount within the one-touch frame;
receiving input within the one-touch frame, wherein the input causes the one-touch frame to determine whether the input indicates a change of state in the one-touch frame, wherein the one-touch frame issues an asynchronous call to the second server and transmits an asynchronous message with an indication of the change of state in the one-touch frame to the second server through the asynchronous call when the input indicates the change of state in the one-touch frame, and wherein the one-touch frame displays the change of state independent of a response from the second server; and
transmitting, based on the received input, content that includes at least one credential and the payment amount from the one-touch frame to the first server, wherein the first server processes a transaction associated with the content.

18. The system of claim 17, wherein the operations further comprise:
generating the payment amount within the webpage; and
incorporating the payment amount within the one-touch frame;
wherein the operations that receive the input further comprise receiving the input within a portion of the one-touch frame that displays the payment amount.

19. The system of claim 17, wherein the operations further comprise:
generating the one-touch frame using a second parameter obtained from a cache memory of a computing device that displays the one-touch frame.

20. The system of claim 17, wherein the receiving the input comprises receiving an indication of the change of state in the one-touch frame that includes a change of a first payment instrument to a second payment instrument, wherein the operations further comprise:
sending the asynchronous message to the second server, wherein the asynchronous message indicates the change from the first payment instrument to the second payment instrument without additional input other than the received input; and
displaying the change within the one-touch frame prior to receiving a response from the second server to the asynchronous message.

21. The system of claim 17, wherein the at least one credential comprises a first payment instrument from a plurality of payment instruments and a shipping address.

\* \* \* \* \*